United States Patent [19]
Salisbury

[11] Patent Number: 5,615,849
[45] Date of Patent: Apr. 1, 1997

[54] MICROWAVE DEICING AND ANTI-ICING SYSTEM FOR AIRCRAFT

[76] Inventor: Jonathan T. Salisbury, 22908 Connells Prairie Rd., Buckley, Wash. 98321

[21] Appl. No.: 421,855

[22] Filed: Apr. 14, 1995

[51] Int. Cl.⁶ .................................................. B64D 15/00
[52] U.S. Cl. .................... 244/134 R; 244/134 D; 219/679
[58] Field of Search .................. 244/134 D, 134 R, 244/134 F, 134 A, 134 B, 134 C, 78, 216; 219/679, 687, 759

[56] References Cited

U.S. PATENT DOCUMENTS

| | | | |
|---|---|---|---|
| 2,142,699 | 1/1939 | Riddle | 244/134 B |
| 2,742,248 | 4/1956 | Le Compte et al. | 244/134 D |
| 3,116,789 | 1/1964 | Kent | 244/134 R |
| 4,060,212 | 11/1977 | Magenheim | 244/134 D |
| 4,091,252 | 5/1978 | Koinuma. | |
| 4,137,442 | 1/1979 | Tateda. | |
| 4,365,131 | 12/1982 | Hansman. | |
| 5,061,836 | 10/1991 | Martin. | |
| 5,220,785 | 6/1993 | Miller | 244/134 R |

*Primary Examiner*—Andres Kashnikow
*Assistant Examiner*—Tien Dinh
*Attorney, Agent, or Firm*—Richard L. Huff

[57] ABSTRACT

A microwave deicing and anti-icing system for aircraft wings, rotors, and airfoils. Microwave energy is absorbed in a propagation tube inside the leading edge of the aircraft wing and turned into thermal energy. An highly absorptive coating on the interior surface of the tube and a mirror/insulator are used to insure the most efficient transforming of the microwave energy into thermal energy. The thermal energy is then conducted to the skin of the wing, rotor, or airfoil by thermal transfer vanes to the skin of the leading edge of the wing, rotor, or airfoil, so that the temperature in that part of the wing, rotor, or airfoil can be raised and maintained well above the freezing temperature to break and prevent ice.

4 Claims, 1 Drawing Sheet

MICROWAVE DEICING AND ANTI-ICING SYSTEM FOR AIRCRAFT

BACKGROUND OF THE INVENTION

1. Field of Invention

This invention relates to a microwave deicing and anti-icing system for aircraft wings, rotors, and airfoils utilizing thermal energy transformed from microwave radiation.

2. Description of the Related Art

Deicing of aircraft wings, rotors, airfoils and other equipment is essential for all-weather winter operation when flying in meteorological conditions where ice accumulation adversely affects lift, drag, weight and otherwise decreases a vehicle's performance.

Typically, turbojet aircraft rely upon heated, high-pressure air to prevent ice buildup on structural wing sections. This bleed air is normally tapped from the turbojet engine at a cost in fuel and decreased thrust as well as increased weight due to extensive, heavy steel ducting systems and associated valves and control mechanisms.

Turboprop aircraft seldom use heated high pressure bleed air for this purpose since they can't afford the performance decrements and weight of such systems. They more commonly employ the 1920's technology of pneumatic deicer boots which inflated in order to break a thin layer of ice that is allowed to accumulate on the wings so that it will be carried away by the slipstream. This system is inefficient and can be fatal as is evidenced by recent tragic losses of turboprop commuter aircraft in October and December of 1994. Other deicing and anti-icing systems include electrically heated pads and electrical vibrating devices. None of these has been used to any extent other than experimentation and military applications due to high costs, high electrical energy requirements, and excessive weight.

In previous microwave deicing and anti-icing systems, as portrayed in U.S. Pat. Nos. 4,060,212, 4,365,131 and 5,061,836, microwave energy is used to prevent icing by directing microwave energy transmitted directly or through a dielectric surface waveguide to the ice or super-cooled water droplets in front of the wings or to remove ice from propulsion blades by treating radially inward surfaces of the blades. The energy loss can be great when microwave is transmitted through the air. Only a small fraction of the transmitted microwave is intercepted by the surfaces which need to be deiced because the microwave is emitted at all angles. Also, because of the reflection of microwave energy from the surface to be deiced, further loss of microwave energy is expected. A dielectric surface waveguide is better in this respect, but it complicates the manufacturing procedures. Therefore the transmission of microwave energy by methods of the prior art is too inefficient to warrant its practical use.

SUMMARY OF THE INVENTION

In the present invention, ice removal or prevention is accomplished by irradiating a thermal propagation tube, which has a highly absorptive coating on the interior surface, with microwave energy from one or more microwave generators. The microwave energy is then transferred into thermal energy, which is conducted through the thermal propagation tube to the aircraft aluminum alloy skin surface, which may be integral with the leading edge of the wing, rotor, or airfoil section. Thermal transfer vanes are incorporated to transmit heat from the tube to the area of the wing immediately behind the leading edge to a point aft of approximately 10–15% of the mean aerodynamic chord.

DESCRIPTION OF THE PREFERRED EMBODIMENTS

Figure 1:
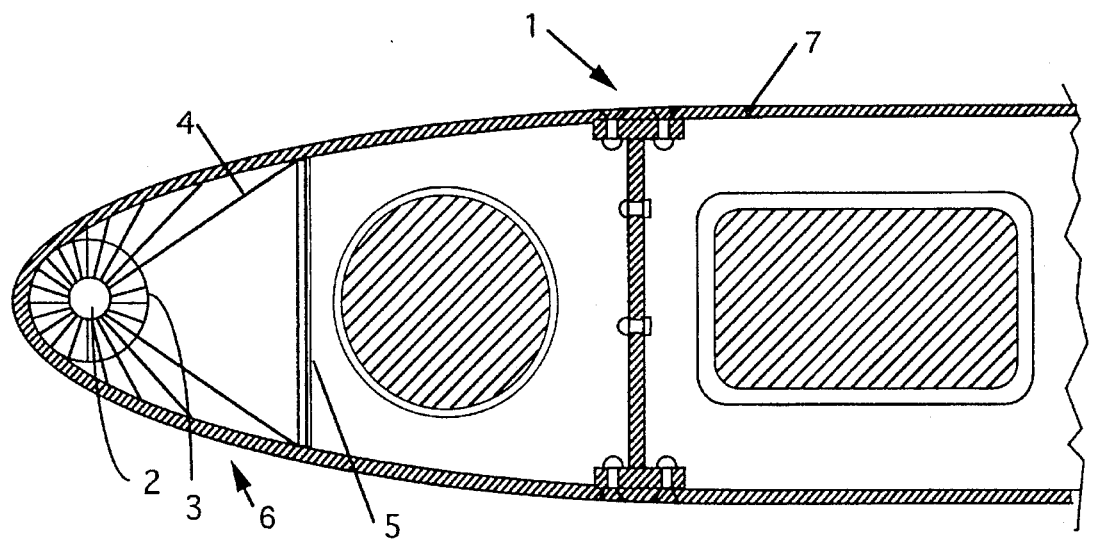
FIG. 1 shows a longitudinal cross-sectional view of the leading edge of an airplane wing containing the microwave system of the present invention.

FIG. 1 is a cross-sectional view of the leading edge of an aircraft wing 1 having inner and outer surfaces, which shows the microwave generator 2 and its proximity to the thermal propagation cube 3 in relation to the wing leading edge area 6. The microwave generator 2 is mounted concentrically within one end of the thermal propagation tube 3. The thermal propagation tube 3 abuts and is parallel to the leading edge 6 of the wing 1. The radial configuration of the thermal transfer vanes 4 connects the core of the thermal propagation tube 3 with the skin 7 of the wing 1 structure. A thermal shielding and microwave reflecting unit 5 is used to prevent the loss of the heat and spurious microwave energy from escaping the leading edge area 6. The propagation tube 3 may be made of fiberglass, composite or graphite. A highly absorptive material for microwave energy is coated on the interior surface of the thermal propagation tube 3, such as resin. The microwave generator 2 is a conventional oscillator such as a Klystron tube. The thermal transfer vanes 4 may be made of aluminum or other metal alloy, and connects the thermal propagation tube 3 with the skin 7 of the wing 1.

Figure 2:
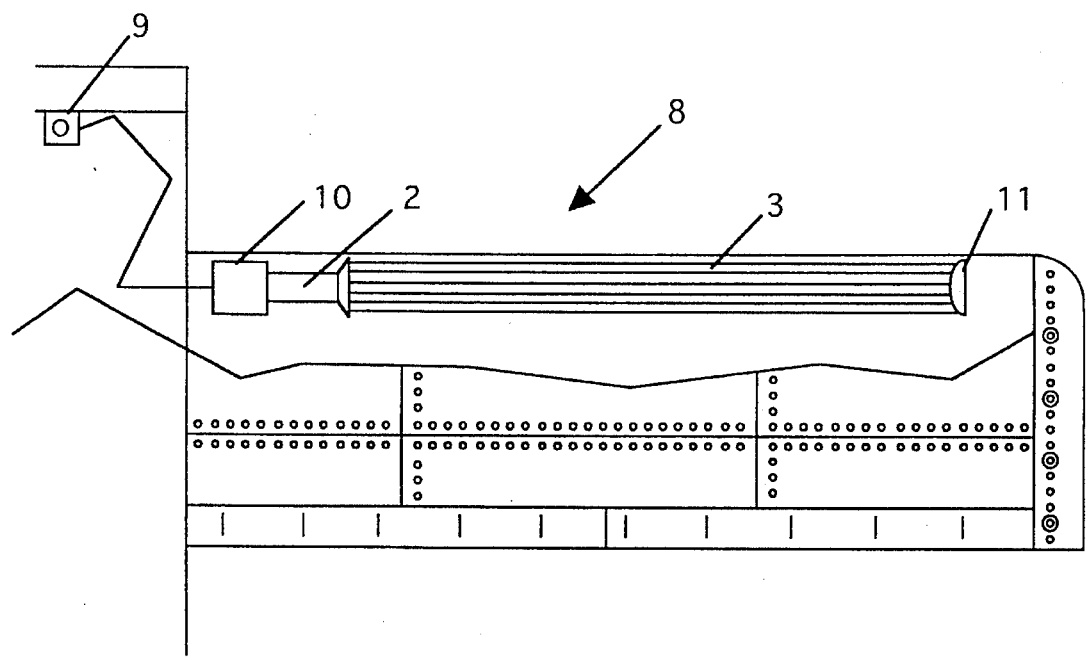
FIG. 2 is a plan view, partly broken away, of an airplane wing showing the relative positions of the microwave generator, power supply, microwave propagation tube, thermal transfer vanes, and the inner and outer surfaces of the wing.

FIG. 2 is a plan view of a simplified wing 8. It shows the placement of the activation switch and timer in assembly 9, which controls the system from the flight deck. In order to minimize peak power demand from the vehicle or equipment generators, the remote switch in the assembly 9 activates a timer in the assembly 9 to energize each microwave unit in sequence when more than one unit is required. Each unit has an appropriate electrical power source 10 for the electricity demands of the microwave generators 2. One or more microwave generators 2 may be utilized depending upon the length of the thermal propagation tube 3 required based on the wingspan or length of the device being protected from ice buildup. In the event only one microwave generator 2 is utilized, a mirror 11 is placed at the end of the tube 3 opposite the microwave generator 2 to reflect microwave radiation back to insure efficient transforming of the microwave energy into thermal energy. If two microwave generators 2 are required, they are placed at opposite ends of the thermal propagation tube 3. Two mirrors 11 facing opposite directions are placed mid-span between the two generators 2 to reflect the microwave radiation back to the tube 3.

Upon activation of the microwave generator 2, the emitted microwave energy is absorbed by the propagation tube 3 and turned into thermal energy, which is conducted by the thermal transfer vanes 4 to heat the inner surface of the skin 7 of the wing 8 well above the freezing temperature. This causes a break in the bonding between ice and the outer surface of the leading edge area 6 of wing 1. The ice is then carried away by the slipstream. By maintaining a sufficiently high temperature, supercooled water droplets in the atmosphere can be prevented from forming ice on the skin 7 of the wing.

I claim:

1. In an aircraft having wings, rotors, or airfoils, which wings, rotors, or airfoils have outer and inner surfaces and leading edges, the improvement which comprises:

(a) at least one microwave generator which generates microwave energy;

(b) at least one thermal propagation tube which is connected to the microwave generator and which abuts the inner surface of, and is parallel to, the leading edge of the wings, rotors or airfoils;

(c) a plurality of thermal transfer vanes connecting the thermal propagation tube and the inner surface of the wings, rotors, or airfoils; and (d) a microwave reflection and heat insulation unit, which prevents the heat energy and microwave energy from escaping the leading edge area.

2. The improvement of claim 1, wherein the at least one thermal propagation tube is made of fiberglass, composite, or graphite.

3. The improvement of claim 2, wherein the at least one thermal propagation tube contains an inner coating of a microwave absorbing resin.

4. The improvement of claim 1, wherein the at least one thermal propagation tube contains a mirror at the end opposite the microwave generator.

* * * * *